Nov. 24, 1970  F. J. KNESS  3,541,743
AIR TERMINAL DOCK

Filed Aug. 16, 1968  4 Sheets-Sheet 2

INVENTOR
FRANCIS J. KNESS
BY Cushman, Darby & Cushman
ATTORNEYS

INVENTOR
FRANCIS J. KNESS

United States Patent Office 3,541,743
Patented Nov. 24, 1970

3,541,743
AIR TERMINAL DOCK
Francis J. Kness, 118 Northeast 2nd St.,
P.O. Box 369, Miami, Fla. 33101
Filed Aug. 16, 1968, Ser. No. 753,151
Int. Cl. B65g 61/28; E04h 6/44
U.S. Cl. 52—64                               5 Claims

ABSTRACT OF THE DISCLOSURE

A passenger embarking and debarking facility for aircraft includes an open-sided building having a passenger floor disposed at an elevation above wing-tip level so that the aircraft may be parked alongside the building with one wing received in the building space below the passenger floor. Passenger access to the doors of the aircraft is provided by lowering an elongated passenger gallery to a position below wing-tip level and alongside and parallel to the fuselage. Ramps provide passenger access between the gallery and the passenger floor of the building.

---

This invention relates to air terminal buildings and in particular to the arrangement and construction of passenger embarking and debarking facilities and aircraft service facilities associated with such buildings.

One of the major problems relating to the efficiency of passenger facilities at airports, particularly airports which handle jet aircraft, is the problem of conveying the passengers from the entrance of the terminal building to the aircraft or from one aircraft to another in a simple and efficient manner. Generally speaking, the distance from terminal entrance to the aircraft consists of the sum of the distances between the terminal entrance and the passenger counter, between the passenger counter and the loading gate and between the loading gate and the aircraft. It is of utmost importance to the convenience of passengers that these distances, particularly the first two, be traversed with as little confusion, time and effort as possible. The primary reason for this is, of course, that the passenger must traverse at least some of these distances on foot while carrying baggage and other personal effects with him. Generally, he will carry or have carried all his baggage to the counter and will then proceed to the aircraft with a smaller amount of baggage. In the case of inter-line passengers the critical distances are between one aircraft and its respective counter, between that counter and the counter of the other airline and between the other airline counter and its respective gate.

In some contemporary airport designs the problem has been attacked by locating the terminal entrance or entrances close to the counter area and to the loading gates by employing self-propelled mobile lounges which convey a load of passengers from the loading gates to the aircraft located at a considerable distance from the terminal. This arrangement permits a compact terminal building because the distances between terminal entrance and counter area and between the various counters and their gates may be kept small. The arrangement therefore reduces the amount of walking required of the passenger, but it is not a complete solution to the problem because of the time of transport within the mobile lounge, initial and maintenance costs of the lounge and the traffic of the lounges as they move across runways and ramps.

Another terminal design which has been employed previously calls for the provision of covered bridges or walkways leading from the gate directly to the aircraft. This arrangement is convenient in that it eliminates stairs between the aircraft and the passenger corridors of the main terminal building or the piers extending therefrom. However, it does not reduce the distance between counter and gate which in many large airports is very substantial owing to the large loading area required for each aircraft.

In major airports the sprawl of the passenger facilities which is required to provide access to the large number of planes being serviced may result in a walk of such great lengths as to be a hardship to persons carrying baggage and to elderly persons, children and physically handicapped persons. In contemporary major airports having as many as 100 gates a distance of ¼ to ⅓ mile for an entrance-counter-gate trip is not uncommon. In the case of inter-line passengers distances as great as 1½ miles may be experienced. While self-powered conveyances, such as battery-powered carts, are employed by some airports to transport passengers within the terminal building and piers, this is only a partial solution to the problem because it does not eliminate the confusion and passenger anxiety associated with traversing the long distance. The so-called "long walk" problem of airports is more fully discussed in American Aviation, July 1960, pages 72 and 73.

It is the primary object of the present invention to provide a design for an airport terminal having a compact arrangement of passenger handling facilities which eliminates a substantial proportion of the walking normally required of embarking and debarking passengers while avoiding the use of self-powered conveyances for transporting the passengers between an aircraft and the terminal building and within the the terminal building. The design provides for locating the aircraft substantially at the gate and for locating the counter area near both the gate and the terminal entrance so that the total distance between terminal entrance and aircraft is quite small.

It is a more specific object to provide an aircraft passenger embarking and debarking building which is adapted to permit the parking of an aircraft fuselage in abutting relationship with one side of the building and which is provided with a novel passenger dock or access arrangement between aircraft and building and an uncluttered aircraft service area below and completely separate from the passenger facilities.

It is a further object to provide a building of the above type having a plurality of passenger docks disposed end-to-end along one or more sides of the building, each dock including a single passenger platform which abuts substantially the entire length of the fuselage of the respective aircraft.

The above objects are achieved, broadly, by means of an open-sided building which is constructed of at least two levels, the lower level being directly underneath the upper level and adapted to receive within it one wing of an aircraft. The levels are separated by a second floor which is divided as necessary into whatever passenger facilities are desired. When the building is a main terminal building, the second floor area will conveniently provide ticket counter areas, waiting room and rest-rooms and may also provide restaurant facilities, shops and other facilities. When the building is in the form of a pier extending from a main terminal building, the second floor area, which is continuous with the second floor of the main terminal, may be no more than a passenger corridor leading to one or more of the aircraft access arrangements.

Since the wings of contemporary aircraft are inclined upwardly from the bottom of the fuselage, the second floor which separates the upper and lower levels of the building is constructed at an elevation above ramp level which is sufficient to permit the wing tip of the aircraft to pass freely into the lower level. This construction places the second floor above the usual doors of the aircraft, and it is therefore necessary to provide some means for passenger access between the doors and the floor area. In the preferred arrangement this means includes a vertically movable horizontal passenger platform which is disposed adjacent the second floor area on the open side of the building. The platform is raised to permit entry of the aircraft wing into the lower level and is lowered so as to be disposed immediately adjacent the side of the fuselage. In its lowered position the platform is below the level of the second floor area of the building, and it is necessary to provide adjustable access ramps or the like between the platform and the floor area.

Preferably the platform is substantially the same length as the fuselage of the aircraft and is of substantial width so as to provide a relatively large, uncluttered area for the passengers to enter or leave the aircraft. The width of the access ramp or other access structure extending between the platform and the floor area may be equal to the length of the platform, or one or more ramps of lesser width may be employed.

The lower level of the building is utilized solely for aircraft service and maintenance and for baggage and cargo handling. The usual ramp and cargo services are therefore carried out completely free of passenger traffic. By passenger traffic is meant, for example, pedestrian traffic and the use of one or more mobile boarding stairs or the like. Further, the service and cargo facilities do not require the large number of cargo carts, luggage carts, water trucks, air-conditioning trucks, toilet trucks and other vehicles, because these facilities may be integrated into the building at fixed locations.

In the case of a major airport the greatest savings in space is achieved by the present invention when the passenger docks are disposed along one or more sides of the building at intervals only slightly greater than the length of an aircraft. This will result in a close spacing of the gates which will reduce the maximum distance between the most widely separated gates. To take advantage of this feature it is necessary to provide some means for moving each aircraft laterally of itself into abutting relationship with the side of the building. This means may include a handling system of the type disclosed in my patent No. 3,136,267. As described therein, the handling system includes an arrangement of tracks extending between the runway area of the airport and any of a plurality of parking areas and a self-propelled wheeled carrier operative for movement along the tracks. The carrier is adapted to receive and support an aircraft and to transport the same along the tracks in either direction between runways and parking area. The design and construction of the building of the present invention does not, however, depend on the details of a particular aircraft handling system.

The invention will be further understood from the following detailed description taken with the drawings in which.

Figure 1:
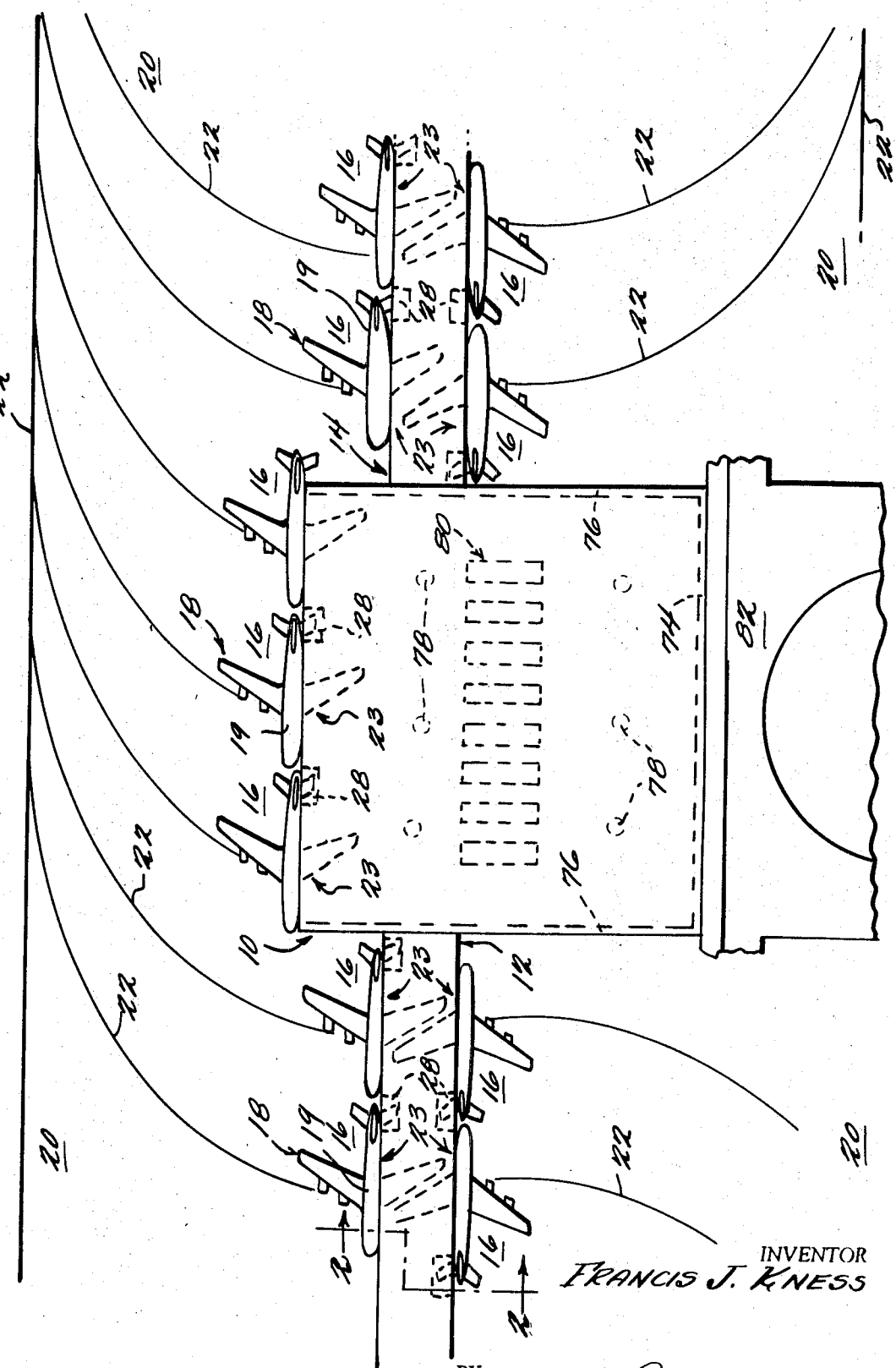
FIG. 1 is a schematic top plan view of an airport terminal building and the ramp area adjacent the building.

Referring first to FIG. 1 there is shown, in simplified form, an airport terminal installation which includes a main terminal building 10 having two piers 12, 14 extending therefrom and a plurality of aircraft parking areas 16 disposed along one side of the terminal building 10 and along both sides of the piers 14, 16. As shown, a large passenger aircraft 18 is disposed in each parking area 16 so as to have one side of its fuselage 19 parallel to and immediately adjacent one side of the building 10 or adjacent one side of one of the piers 12, 14.

The various aircraft 18 are moved between their parking areas 16 and adjacent access taxiway areas 20 by means of a transport system adapted to move the aircraft on the ground in a direction transversely to the normal direction of aircraft movement. Conveniently, the transport system includes a system of railroad tracks 22 which extend between the parking areas 16 and the remote runways (not shown). Mobile carriers 21 (FIG. 2) adapted to support an aircraft from below are movable along the tracks 22 so that each of the aircraft 18 may be positioned very accurately in its parking area 16. My aforementioned patent No. 3,136,267 fully discloses a transport system of the kind illustrated schematically in FIGS. 1 and 2.

The terminal 10 and the piers 12, 14 are constructed with a series of identical dock areas 23 disposed end-to-end along the sides of the building, each dock area 23 being adapted to handle the passenger and cargo loading and unloading for one aircraft 18. One of the important features of the building construction is the arrangement which receives one wing of the aircraft 18 within the building at each dock area 23 so that the aircraft may be disposed immediately adjacent one side of the building. To this end each dock area 23 is free of side walls and is constructed with a second floor 24 spaced above ground level 26 or its equivalent, a distance such that the entire wing of a parked aircraft 18 may be received into the lower level which is defined between the second floor 24 and a first floor 27. In the illustrated arrangement the elevation of the second floor 24 is somewhat below the stabilizer sections of the aircraft 18. To accommodate within the building the onehalf stabilizer section corresponding to each in-building wing, the second floor is cut away at the ends of each dock area 23, as illustrated at 28.

Figure 2:
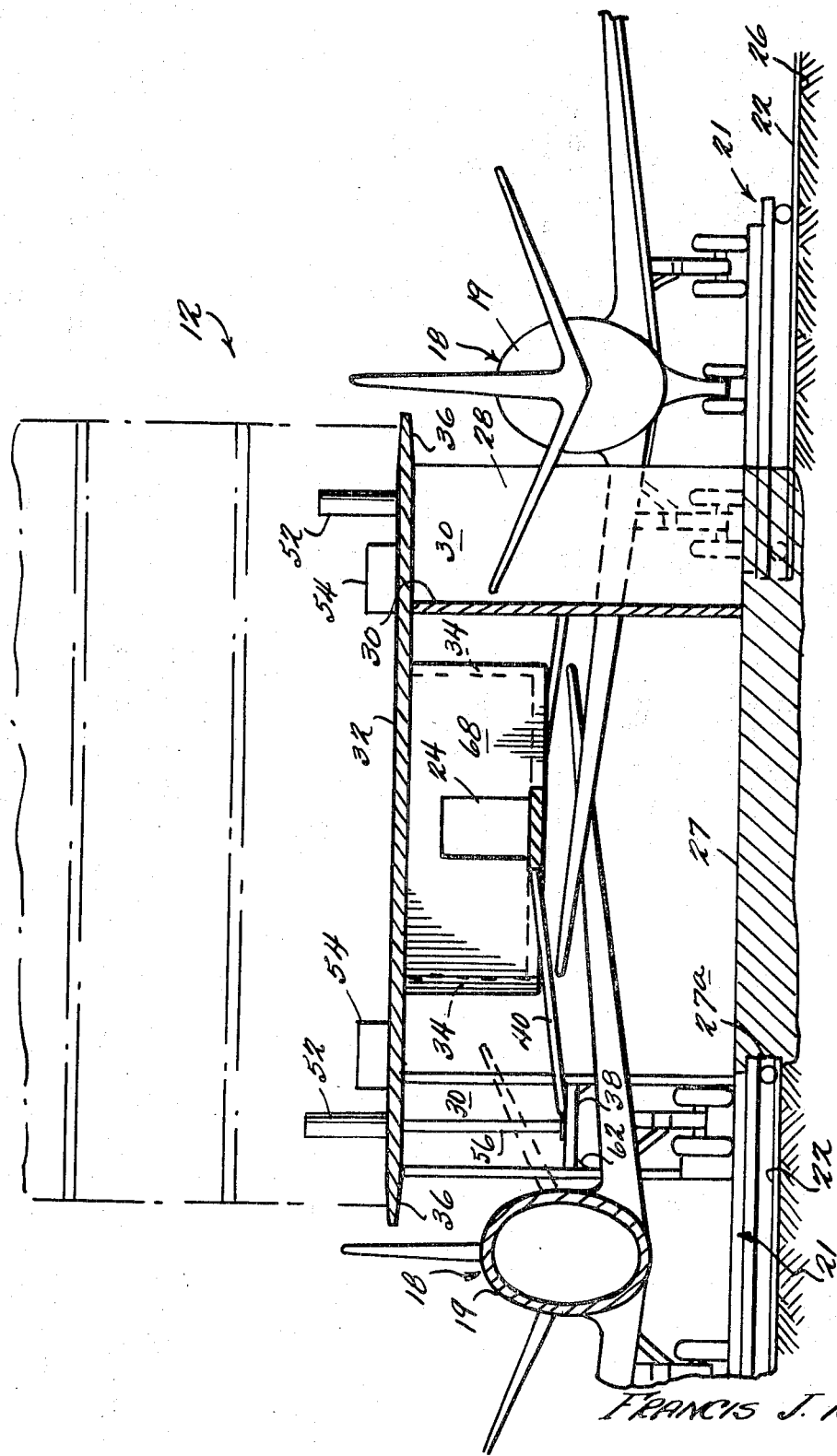
FIG. 2 is a schematic sectional view taken on the line 2—2 of FIG. 2.
Figure 3:
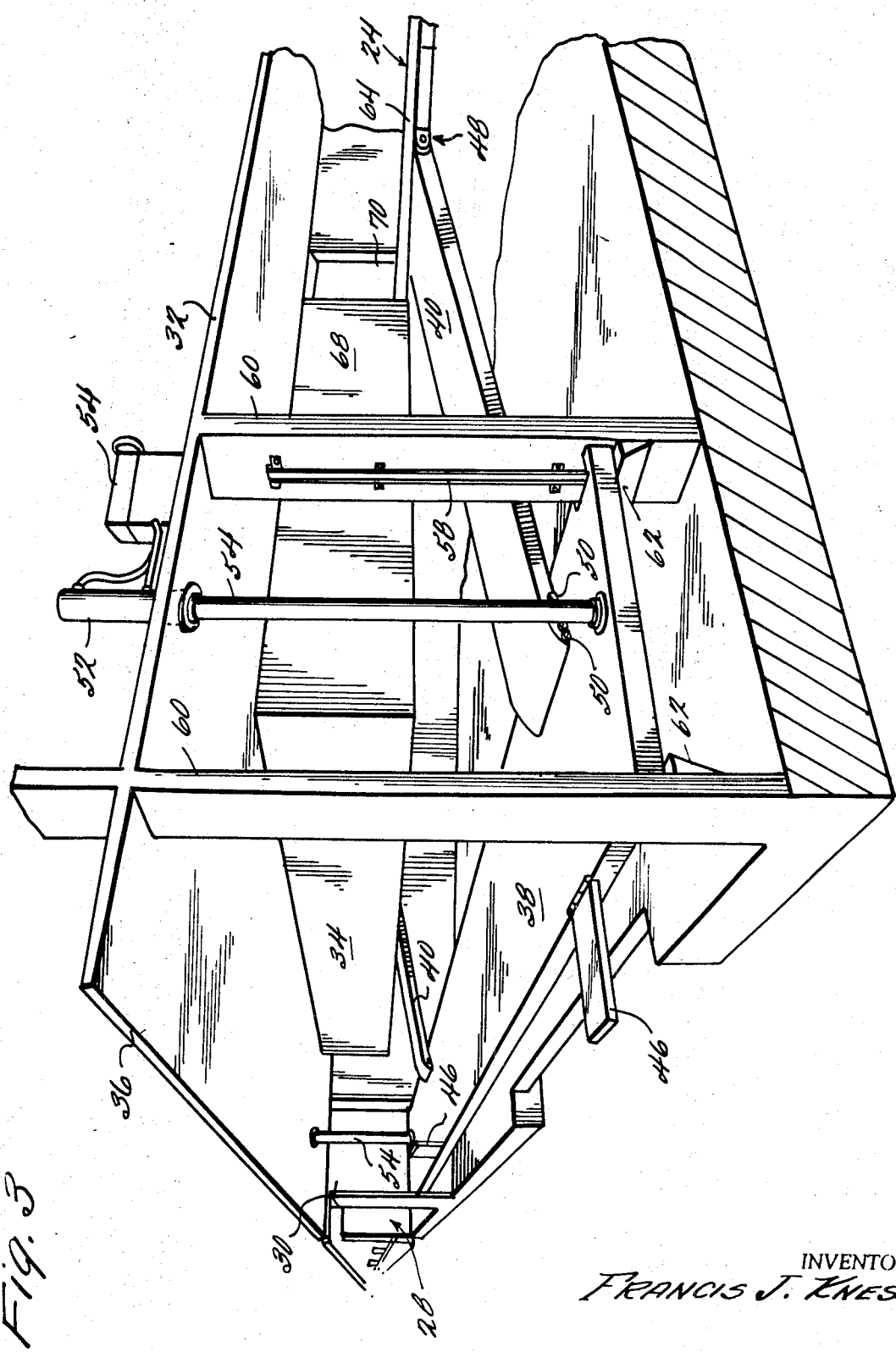
FIG. 3 is a perspective view of the left-hand portion of the installation of FIG. 1.

The cutout areas 28 may be surrounded on three sides by vertical walls 30 which extend from the ground floor 27 to a roof 32 which is spaced directly above the second floor 24. The structure 32 may, of course, serve as the third floor of multifloored structure if desired, as shown in FIG. 2. The second floor 24 of the piers 12 and 14 may be supported, as illustrated, by being suspended from the roof 32 by vertical members such as walls 34. This arrangement leaves the lower level free of obstructions, except at the end of each dock area 23 where the walls 30 are supported on the ground floor 27. The elevation of the roof 32 is above the top of the aircraft fuselage 19, and to protect passengers from the weather there is provided an overhanging portion 36 which extends outwardly over the inboard side of the fuselage.

The first floor 27 is cut away as at 27a in order to receive a section of the carrier 21 or the carrier of any other aircraft handling system, the size and shape of the cutout 27a being determined by the nature of the handling system. This permits the aircraft 18 to be brought into close proximity with the parts of the terminal 10 employed for boarding purposes.

As best seen in FIG. 2, the second floor 24, is being sufficiently high to allow passage of an aircraft wing thereunder, is above the level of the usual access doors in the fuselage 19. To effect convenient and rapid communication between the access doors and the second floor 24 is there provided at each dock area 23 a vertically adjustable passenger board 38 of substantial size and one or more access ramps 40 extending between the platform 38 and the second floor 13. Each gallery 38 is of a length substantially equal to the length of the fuselage 19 from nose to the leading edge of the stabilizer, although the length may be somewhat less than this dimension. Preferably, the length is great enough to span the maximum longitudinal distance between the aircraft access doors, such as those illustrated at 42 and 44. To bridge the gap between a fuselage and the galley there is provided a suitable passenger access structure. As shown, a dock board 46 is hinged to the outer edge of each platform 38 opposite the location of each of the access doors 42 and 44. The access ramps 40 may be any suitable structure for bridging the space between the galleries 38 and the second floor 24. As shown, the ramps 40 are inclined walkways hinged at their inner ends at 48 to the second floor 24 and provided at their outer ends with rollers 50 which ride on the upper surface of the gallery 38. If desired, the ramps 40 may be constructed in the form of stairs, escalators or revolving endless walkways. The usual passenger gates through which the passengers pass in embarking and debarking are conveniently located at the upper ends of the ramps 40.

Each of the galleries 38 is provided with a raising and lowering mechanism so that it may be raised to permit entry of an aircraft wing into the lower level of the pier and subsequently lowered to a position immediately adjacent a fuselage 19. Preferably, the mechanism is located in a position such that it does not project into the operating space of the lower level, because it is desired that this area be maintained as open as possible. In the illustrative embodiment the mechanism is shown in the form of a hydraulic piston and cylinder assembly 52 which together with its power system 54 is located on the roof 32 above each end of each gallery 38. Each gallery 38 is connected to the pistons of the associated assemblies 52 by means of two vertical piston rods 56 which pass through the roof 32. The galleries 38 are guided during vertical movement by any suitable means such as vertical guide rails 58 which are carried by pillars 60 disposed at the ends of the galleries. The pillars 60 may be in the form of lateral projections which are integral with the walls 30, or they may be separate structures which serve to support the roof 32. Conveniently the pillars 60 also carry vertically adjustable stop members 62 which are engaged by the lower surface of the galleries 38 when the latter are in their lowered position.

Figure 4:
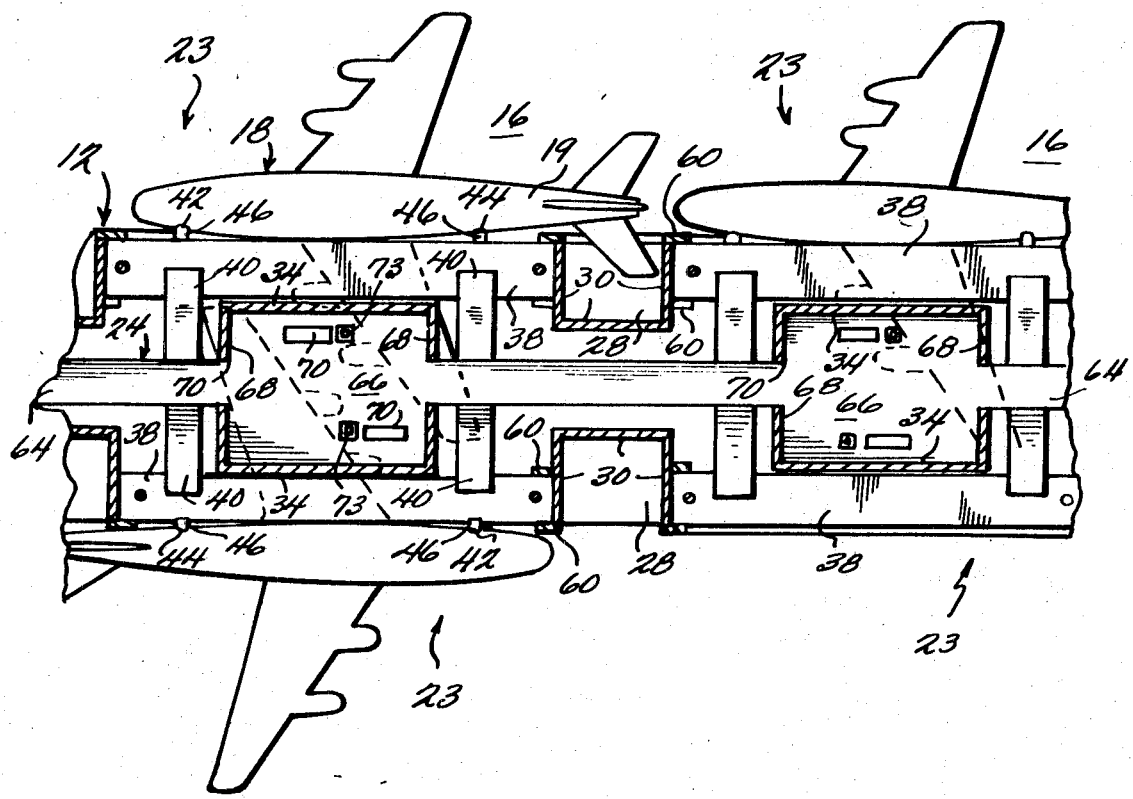
FIG. 4 is a horizontal sectional view of a pier taken through the upper levels.

In the particular construction illustrated and referring to FIG. 4, it will be seen that the second floor 24 of the piers 12 and 14 includes a longitudinal center walkway 64 which opens into a room 66 at each dock area 23. Each room 66 is defined by the walls 34 which extend parallel to the platform and by transverse walls 68, the latter being provided with doorways 70 at the location of the center walkway 64. The rooms 66 serve as waiting rooms for debarking passengers and, conveniently, they may contain the usual counters 72 at which debarking passengers check their baggage and obtain flight information. Conveniently, also, there is provided a baggage chute 73 or similar device by means of which baggage may be easily transported directly to the first floor level adjacent the fuselage 19. If desired, the chutes 73 may lead directly into the baggage compartment of the aircraft.

It will be understood that the arrangement of waiting rooms, counters, walkways and other passenger facilities on the second floor 24 may be varied to obtain the most convenience for the passengers and will depend in part on the width and length of the pier 12 and on the number of passengers to be processed. In some cases, for example, it may be desirable to locate all the facilities, with the exception of the usual passenger gate, in the main terminal 10.

The dock areas 23 in the main terminal 10 are of the same construction as the dock areas 23 in the piers 12, 14. That is, each dock area 23 in the terminal 10 includes a lower level which is substantially free of obstruction, a second floor portion, a vertically movable boarding gallery and access ramps or the like extending between the second floor and the boarding gallery. The first and second floors of the terminal 10 are, of course, continuous with the first and second floors of the piers. The second floor, which in its entirety is of substantial size, may be supported from the ground in any conventional manner as by a front wall 74, side walls 76 and interior pillars 78. The passenger facilities may be arranged in any convenient manner and will normally include at least a counter and baggage chute area 80, waiting areas, restrooms and restaurant facilities. The area 80 may be employed to process passengers for both the main terminal 10 and the piers 12 and 14 or for the main terminal 10 only. In either case it will be desirable to provide the usual gate facilities at the inboard end of the access ramps both in the main terminal 10 and in the piers 12 and 14.

A dock area 23 is readied for passenger service by being raised to a height which is sufficient to permit entry into the lower level of one wing of an aircraft 18. Then one of the mobile carriers 21, with an aircraft 18 on top of it, is moved along one of the railroad tracks into one of the cutouts 27a in a direction transverse to the longitudinal dimension of the gallery 38. As seen in FIG. 2, the top of the carrier is preferably at the same level as the surface of the first floor 27 so that servicing and baggage handling is facilitated. The gallery 38 is then lowered, usually a distance of about seven feet, until it is directly opposite the aircraft access doors.

The processing of passengers in the illustrated airport installation is rendered fast and efficient as a result of the compact arrangement of facilities and the provision of the dock areas 23 which reduce passenger congestion during embarking and debarking. While the conventional processing sequence may be employed, the distance which a passenger must walk is substantially shorter than in large contemporary airports. In addition, the passengers are not subjected to the weather and need not traverse any stairs. For example, a passenger arriving at the main terminal 10 by motor vehicle will be deposited at second floor level at an entrance ramp 82 which has been built up to the proper elevation. He will then walk either to the counter area 80 in the main terminal or to one of the counters 70 in one of the piers 12 and 14, depending on the practice at the particular airport. In the latter case the appropriate counter 70 will be located at the dock area 23 servicing the aircraft which the passenger intends to board. At the counter 80 or 70 the passenger will have his ticket checked in the usual manner and will check his baggage. He will then walk the short distance to the appropriate ramp 40, pass through the usual gate and descend to the passenger gallery 38. The latter is protected from the weather by the roof overhang 36 and is of substantial size so as to accommodate a relatively large number of persons, thereby reducing passenger congestion at this stage. At his convenience the passenger crosses the appropriate dock board 46 into the adjacent aircraft 18.

An inter-line passenger debarking at one dock area 23 and intending to debark at another dock area 23 also benefits from the compact and efficient arrangement of facilities. One of the disadvantages of large contemporary airports is the confusion and anxiety felt by an inter-line passenger when he is faced with an approaching departure time and a large distance to travel to the departing plane. The present arrangement reduces to a minimum the distance between the most widely spaced dock areas 23 and the confusion in traversing the distance.

The lower levels of both the main terminal 10 and the piers 12 and 14 are completely free of passenger traffic including not only the passengers themselves but also the mobile boarding steps and the like which are conventionally employed. Maintenance operations may be carried out by means of fixed installations located at each dock area or they my be carried out with the usual variety of fuel trucks and other maintenance vehicles. In either case the operations may be performed efficiently due to the fact that the lower level of each dock area 23 is uncluttered with building supports or other non-aircraft equipment.

The processing of passenger baggage in the lower level may be carried out in any desired manner. Conveniently, baggage which is checked by an embarking passenger at the proper counter in the upper level is conveyed directly into the aircraft below by being deposited in the chute 73. Baggage which is unloaded from an aircraft may be placed on a horizontal endless conveyor extending from the dock area to a main conveyor which extends longitudinally along the lower level to a central collection area. The collection area may be located in the lower level or in the upper level. In the latter case an elevating conveyor will be provided to raise the baggage from the discharge end of the main conveyor to the upper level.

It will be understood that the drawings are illustrative of the principles of the invention and that in the interest of simplicity a number of details have been omitted. For example, it will be apparent that, in practice, safety railings will be provided at the edges of the passenger boarding gallaries 38 and elsewhere. It will be apparent, also, that the shape and size of the main terminal 10 may be varied and that the number and pattern of the piers 12 and 14 does not affect the novel features of compactness and efficiency obtainted by the dock structure in combination with upper and lower levels.

While preferred embodiments of the present invention have been described, further modifications may be made without departing from the scope of the invention. Therefore, it is to be understood that the details set forth or shown in the drawings are to be interpreted in an illustrative, and not in a limiting sense.

What is claimed is:

1. A passenger embarking and debarking facility for aircraft having wing-tips of a predetermined height and a fuselage of a predetermined length from the front of the aircraft to a point adjacent to the stabilizer of the aircraft, comprising:

a building having a passenger floor disposed at an elevation which is above said predetermined height, said building being open along at least a portion of one side so as to expose an edge of said passenger floor and so that one wing of the aircraft may be received within the building below said passenger floor thereby permitting the aircraft to be parked alongside the building and parallel to the side thereof;

a horizontal elongated passenger boarding gallery disposed parallel to said passenger floor between the exposed edge of the latter and the aircraft, said gallery having a length about equal to said predetermined length of the aircraft forward of the aircraft stabilizer;

means for supporting said gallery from above to facilitate servicing of the aircraft from that portion of the edge below the level of said passenger floor and for raising and lowering said gallery in a continually horizontal position between an elevation above said predetermined height and an elevation below said predetermined height whereby said gallery may be raised to permit entry of one wing of the aircraft into the building and subsequently lowered to a position opposite one side of the aircraft fuselage for permitting movement of passengers between said gallery and the aircraft; and an adjustable passenger access ramp extending between said passenger floor and the building and said gallery.

2. A building as in claim 1 wherein the building space above said passenger floor is divided by vertical walls into passenger handling facilities including a ticket counter area, waiting room and restrooms, whereby said counter area may be located close to both said passenger boarding gallery and the building entrance, and the lower level below said floor being substantially unobstructed by vertical structure so as to facilitate servicing of the aircraft.

3. A building as in claim 1 in combination with an air terminal building having a main floor area which is divided by vertical walls into passenger handling facilities including a ticket counter area, waiting room and restrooms, the building space above and below said passenger floor defining a pier extending from said main terminal building, said passenger floor being continuous with and substantially coplanar with said main floor area of said terminal building.

4. A building as in claim 1 wherein there is a plurality of said passenger boarding galleries spaced apart along said side of said building.

5. A facility as in claim 1 including at least one adjustable dock board associated with said gallery, said dock board having one end mounted at the edge of said gallery nearest the aircraft and a free end for cooperating with a doorway in the fuselage of the aircraft.

References Cited

UNITED STATES PATENTS 3,136,267    6/1964    Kness _____ 104—48
3,369,264    2/1968    Kurka _____ 14—71

JOHN E. MURTAGH, Primary Examiner

U.S. Cl. X.R.

14—71; 52—126, 236